United States Patent
Jarsaeter et al.

(10) Patent No.: US 11,407,347 B2
(45) Date of Patent: Aug. 9, 2022

(54) MULTIPLE STAGE HEADREST

(71) Applicant: Zoox, Inc., Foster City, CA (US)

(72) Inventors: Mikael Jarsaeter, Burlingame, CA (US); Markus Jost, San Mateo, CA (US); Andrew John Piper, Palo Alto, CA (US); Marcos Puerta Terron, Cheltenham (GB); Andrew Frank Raczkowski, San Jose, CA (US); Daria Di Costanzo, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/442,169

(22) Filed: Jun. 14, 2019

(65) Prior Publication Data

US 2020/0391637 A1    Dec. 17, 2020

(51) Int. Cl.
| | |
|---|---|
| *B60N 2/888* | (2018.01) |
| *B60N 2/865* | (2018.01) |
| *B60N 2/838* | (2018.01) |
| *B60N 2/80* | (2018.01) |

(52) U.S. Cl.
CPC ............. *B60N 2/888* (2018.02); *B60N 2/838* (2018.02); *B60N 2/865* (2018.02); *B60N 2002/899* (2018.02)

(58) Field of Classification Search
CPC ........ B60N 2/888; B60N 2/838; B60N 2/865; B60N 2002/899
See application file for complete search history.

(56) References Cited

U.S. PATENT DOCUMENTS

| | | | | |
|---|---|---|---|---|
| 6,779,840 B1 * | 8/2004 | Farquhar | ............... | B60N 2/4228 297/216.12 |
| 7,556,313 B2 * | 7/2009 | Browne | ................. | B60N 2/888 297/216.12 |
| 7,631,933 B2 * | 12/2009 | Fujita | ................... | B60N 2/4228 297/216.12 |
| 8,322,790 B2 * | 12/2012 | Tscherbner | ............ | B60N 2/832 297/408 |

(Continued)

FOREIGN PATENT DOCUMENTS

EP    2865564 31    10/2018

OTHER PUBLICATIONS

The International Report on Preliminary Patentability for PCT Application No. PCT/US20/37513 dated Dec. 23, 2021, 7 pages.

*Primary Examiner* — Philip F Gabler
(74) *Attorney, Agent, or Firm* — Lee & Hayes, P.C.

(57) ABSTRACT

A headrest may be fixed relative to a seat or a bank of seats in a vehicle and can provide multiple stages of deformation in response to a collision event. The headrest can include a resilient member that deforms in response to a first force caused by the collision event. The headrest can also include a frame that deforms in a first manner in response to a second force greater than the first force and in a second manner in response to a third force greater than the second force. Such a headrest can provide improved impact mitigation for occupants, regardless of height and/or weight such that occupants ranging from the $5^{th}$ to $95^{th}$ percentile in height and/or weight are afforded similar impact mitigation despite a fixed headrest structure. In some examples, multiple such headrests may be conjoined.

18 Claims, 11 Drawing Sheets

(56) References Cited

U.S. PATENT DOCUMENTS

| | | | |
|---|---|---|---|
| 8,789,400 B2 | 7/2014 | Roszczenko et al. | |
| 8,814,271 B2* | 8/2014 | Ishimoto | B60N 2/806 |
| | | | 297/408 |
| 8,840,182 B2* | 9/2014 | Onji | B60N 2/868 |
| | | | 297/233 |
| 8,857,904 B2* | 10/2014 | Gaeng | B60N 2/885 |
| | | | 297/216.12 |
| 8,864,228 B2* | 10/2014 | Ishizaki | B60N 2/4221 |
| | | | 297/216.14 |
| 8,911,016 B2* | 12/2014 | Fujiwara | B60N 2/065 |
| | | | 297/257 |
| 9,981,587 B2* | 5/2018 | Mizobata | B60N 2/80 |
| 10,518,679 B2* | 12/2019 | Leek | B60N 2/832 |
| 2002/0190550 A1* | 12/2002 | Huang | B60N 2/763 |
| | | | 297/248 |
| 2015/0159721 A1* | 6/2015 | Okubo | F16F 7/108 |
| | | | 297/404 |

\* cited by examiner

MULTIPLE STAGE HEADREST

BACKGROUND

Headrests are provided for passenger comfort and safety. Generally, headrests are attached to individual seats, or banks of seats, in various forms of vehicles, including aircraft, watercraft, automobiles, and the like. Headrests are provided to both allow a passenger to rest their head, as well as to absorb impact upon a collision event, e.g., when the vehicle collides with another object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
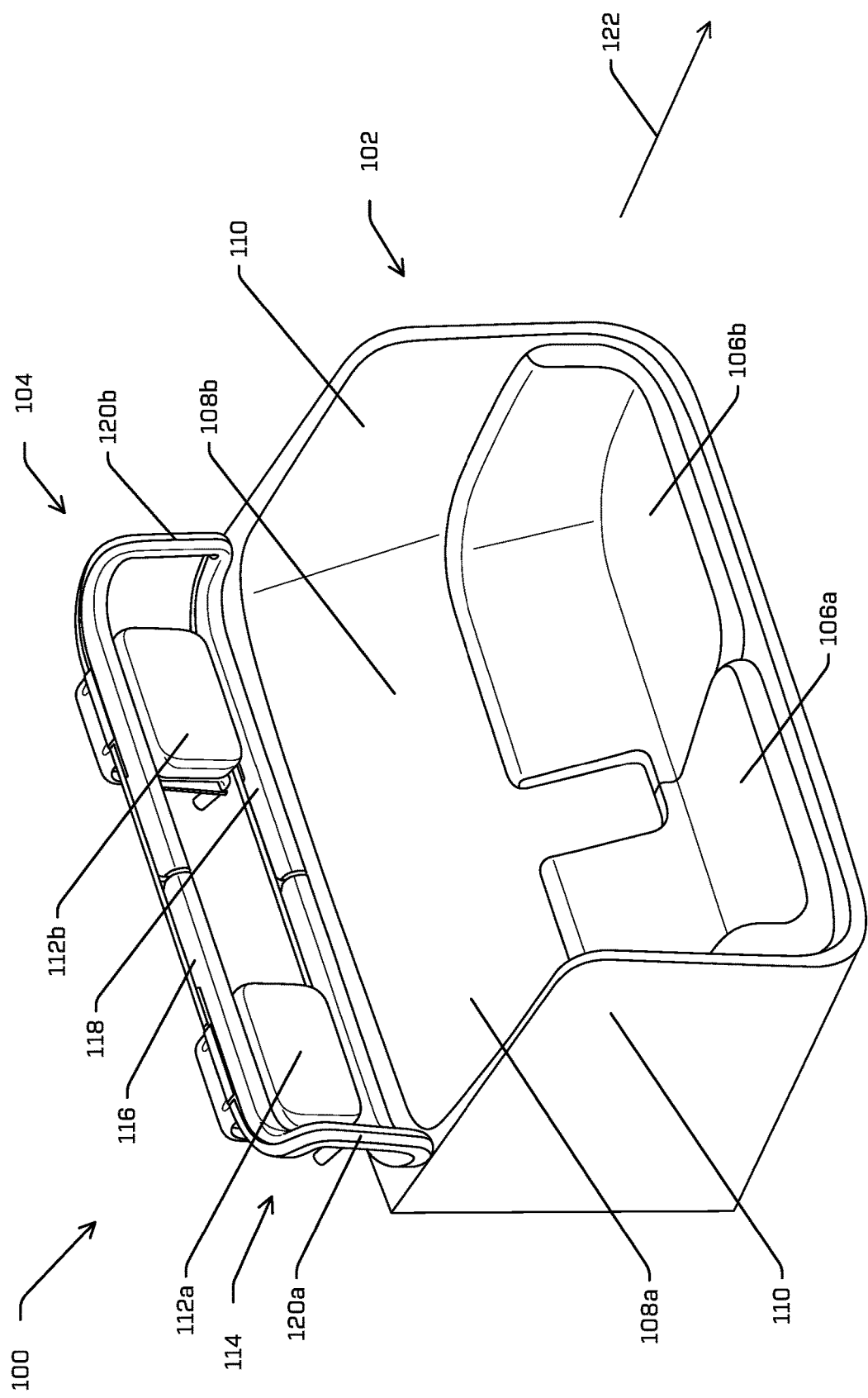
FIG. 1 illustrates a perspective view of an example vehicle seating arrangement including a headrest, as described herein.

The following detailed description is directed to headrests for use in vehicles, and more particularly to fixed headrests for use in a vehicle that may provide desirable safety outcomes regardless of a direction of travel of the vehicle and/or size of the associated passenger.

As briefly described above, headrests are used to provide passenger comfort and to provide a safety mechanism in the event of a vehicle crash or collision, e.g., by supporting and absorbing energy from an occupant's head and neck. In some examples, a headrest for a vehicle, such as a land vehicle (e.g., automobile, bus, truck, van, train, etc.), a watercraft, an aircraft, a spacecraft, and the like, can improve safety outcomes for passengers in the event of a collision proximate the rear of the user. For example, in a conventional vehicle, a rear-end collision or a collision in which the vehicle is backing up can cause a passenger's head and neck to move backward relative to the vehicle, e.g., driving the passenger's head into the headrest. Moreover, some vehicles may configure seats such that passengers are facing in opposite directions. In these examples, regardless of the direction of travel, a collision at either end of the vehicle could result in one or more passengers experiencing a force driving the passenger into the seat and associated headrest.

Regardless of the direction of travel, the following detailed description is further directed to a fixed headrest structure (which may be coupled, or otherwise provide head and neck support to multiple seating positions) that is capable of providing a desired level of safety regardless of the size (e.g., height) of the associated passenger. In at least some examples, the headrest structure can include multiple headrest portions coupled by a transverse frame.

In some examples, headrests described herein can provide multiple phases of deformation, depending upon a force exerted on the headrest by the passenger's head. In at least some examples, a headrest as described herein can include a resilient member configured for contact by the passenger's head and a frame configured to support the resilient member. For instance, the resilient member can be a polymer or other compressible material positioned directly behind the passenger's head. The frame can include a structure that secures the headrest relative to the vehicle. In at least some examples, the frame may mount the headrest independent of a corresponding seat. For example, the frame can secure the headrest to a frame of the vehicle or some other structure associated with the vehicle. In at least some examples, the frame can also be configured to provide one or more areas of deformation. In at least one example, the frame can include an inverted U-shaped structure in which a first leg is secured to a back surface of the resilient member and a second leg is spaced from the first leg by an intermediate member. At the end of the second leg opposite the intermediate member, the frame can also include a mounting member configured to secure the frame to the vehicle. Also in examples, a second resilient number can be placed between a back surface of the resilient number and the second leg of the frame. For instance, the second resilient member can be beneficial for relatively shorter or smaller passengers, as described herein.

In implementations described herein, example headrests can provide multiple phases or stages of deformation, e.g., to provide improved safety outcomes for passengers in the vehicle. In at least some examples, in response to a first force between the passenger's head and the resilient member, the resilient member may compress, or otherwise deform. With a continued, stronger force, the U-shaped portion may deform about the intermediate member, e.g., with the first leg moving relatively closer to the second leg. Also in examples, with a continued, still larger force, the second leg may bend relative to the mounting member and/or portion of the vehicle frame. In at least some examples, the deformation phases just described can control a movement of the passenger's head and neck to reduce strain, e.g., by minimizing acceleration and/or rotation of the passenger's head/neck, in the event of a crash or other impact behind the passenger.

In some examples, the deformation phases can be facilitated by forming the frame of multiple materials. For instance, a first portion of the frame that is configured to deform at a relatively lower force can be formed of a first material having a first stiffness and a second portion of the frame that is configured to deform at a relatively higher force can be formed of a second material having a second stiffness higher than the first stiffness. In at least some examples, the portions of the frame can be formed of a tubular material, such as hollow tubes. In such instances, the relatively stiffer hollow tubes can have an increased wall thickness or increased diameter relative to portions intended to have a lower stiffness. In any one or more of the examples, the relative stiffness of the materials may be chosen in order to provide a desired level of head and neck safety for various impacts, as may be determined based on physical parameters of an individual in any of the $5^{th}$ percentile in height/weight through the $95^{th}$ percentile.

In examples of this disclosure, a headrest can be fixed relative to the vehicle and relative to a passenger seat. Stated differently, in examples of this disclosure, the headrest may not be adjustable. This is in contrast to conventional headrests that are configured to move substantially vertically relative to the passenger seat, e.g., to accommodate relatively taller and/or shorter passengers. Although not adjustable in some implementations, example headrests described herein can improve safety outcomes for passengers of various heights. For example, as detailed herein, the headrest may improve safety outcomes for passengers ranging from the $5^{th}$ percentile in size (e.g., height) and weight to the $95^{th}$ percentile in size and weight relative to conventional headrests.

In some examples, headrests described herein may be configured for use with one or more seats in a vehicle. In some examples, the headrest may be a wraparound, conformal headrest, that wraps around at least a portion of an interior, passenger compartment, and/or seating area of a vehicle. In some examples a single headrest may wrap around substantially an entire interior of a vehicle body providing a headrest platform for any number of corresponding seats. In some examples, a headrest may be provided for a subset (e.g., at least two but less than all) of the seats in the vehicle. For instance, a headrest may be provided for each row or bench of two or more seats. In some examples, the headrest may wrap at least partially around at least three sides of an interior seating area of the vehicle. For instance, in some examples the wraparound headrest may span a back of the interior seating area and extend at least partially on to each lateral side of the interior seating area. Thus, in such examples, the wraparound headrest may have a substantially U-shape when viewed from above. In such examples, the wraparound headrest may be configured for attachment to lateral sides of the vehicle.

The techniques and systems described herein may be implemented in a number of ways. Example implementations are provided below with reference to the figures.

FIG. 1 illustrates a portion 100 of an interior of a vehicle, such as an automobile. The portion 100 generally includes a seating area 102 and a headrest 104 associated with the seating area 102. In more detail, the seating area 102 includes a first seat portion 106a having a corresponding first seatback portion 108a and a second seat portion 106b having a corresponding second seatback portion 108b. In the example of FIG. 1, the seating area 102 may terminate at lateral sides 110 however, the lateral sides 110 are shown for example only. In some instances, the lateral sides 110 may be interior, lateral sides of a vehicle in which the seating area 102 and the headrest 104 are disposed.

The headrest 104 can include a first passenger headrest portion 112a and a second passenger headrest portion 112b. As illustrated, the first passenger headrest portion 112a generally corresponds to the first seat portion 106a and the corresponding first seatback portion 108a, and the second passenger headrest portion 112b generally corresponds to the second seat portion 106b and the corresponding second seatback portion 108b. As also illustrated in FIG. 1, the headrest 104 may also include an outer frame 114 generally connecting the first passenger headrest portion 112a to the second passenger headrest portion 112b. More specifically, the outer frame 114 can be a transverse frame including a top member 116 and a bottom member 118 generally extending, respectively, above and below the first passenger headrest portion 112a and the second passenger headrest portion 112b. Moreover, the top member 116 and the top bottom member 118 can terminate at lateral ends 120a, 120b, which may generally align with the later sides 110 of the seating area 102. Also in the illustrated example, the top member 116 and the bottom member 118 can be curved proximate the lateral ends 120a, 120b, e.g., to provide a U-shape when viewed above. In examples, the U-shape provides a wraparound headrest, e.g., such that the lateral ends 120a, 120b are positioned proximate a side of a passenger's head, when the passenger is seated in the seating area. Moreover, in some instances the lateral ends 120a, 120b can be fixed, e.g., bolted, clipped, or otherwise secured, to an inner surface of the vehicle in which the portion 100 is disposed.

In the example of FIG. 1, the seating area 102 is configured for up to two passengers. In other examples, implementations described herein can apply to more or fewer seats. For example, and as described further herein, the headrest 104 can be associated with a single seat or with a seating area 104 configured for more than two passengers. For instance, if the seating area was wide enough to seat three passengers the headrest 104 could include another passenger headrest portion, like the first passenger headrest portion 112a and the second passenger headrest portion 112b, e.g., for the third passenger. In such an example, the outer frame 114 may be wider, as necessary.

In examples, the seating area 102 and the headrest 104 can be configured in any number or types of vehicles. By way of nonlimiting example, the seating area 102 and the headrest 104 may be used in autonomous vehicle. In some examples, the autonomous vehicle may be a bi-directional vehicle, such that the vehicle may be configured to drive forward in a first direction and forward in a second, opposite direction. Accordingly, as will be appreciated, a vehicle including the seating area 102 and the headrest 104 may be configured to drive forward in a direction indicated by an arrow 122 or the direction opposite the direction of the arrow 122.

As detailed further herein, aspects of this disclosure may be well suited to minimize the effects of a collision event in which a passenger in the seating area is forced against the seat back portion 108a, 108b. For instance, the headrest 104 may be well suited for an impact or collision event that causes force to be imparted on the portion 100 generally in the direction of the arrow 122.

Figure 2A:
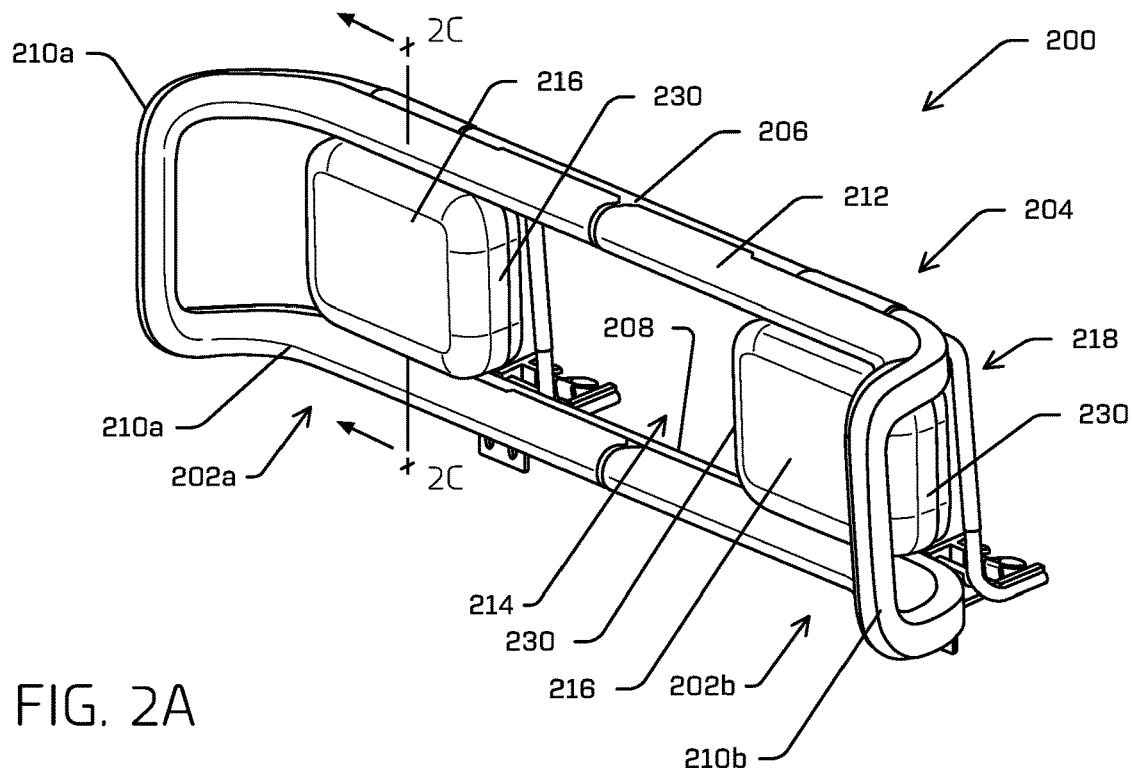
FIG. 2A is a front perspective view of an example headrest, as described herein.
Figure 2B:
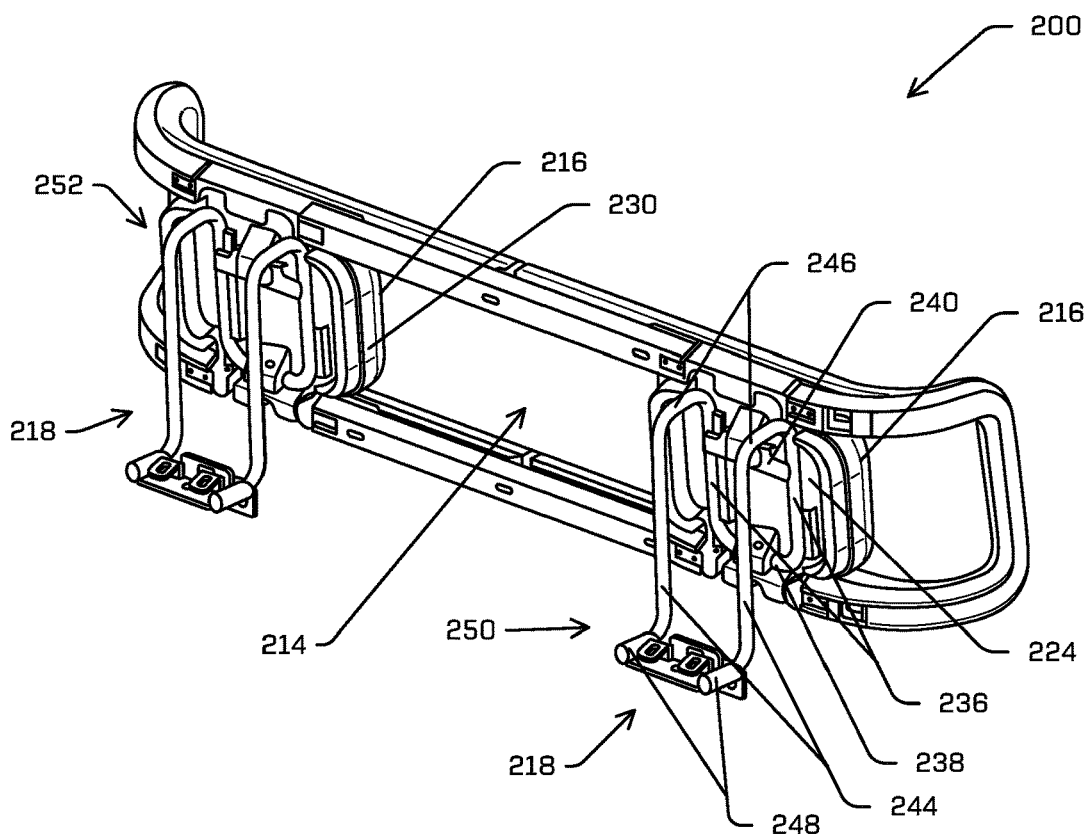
FIG. 2B is a rear perspective view of the example headrest shown in FIG. 2B.
Figure 2C:
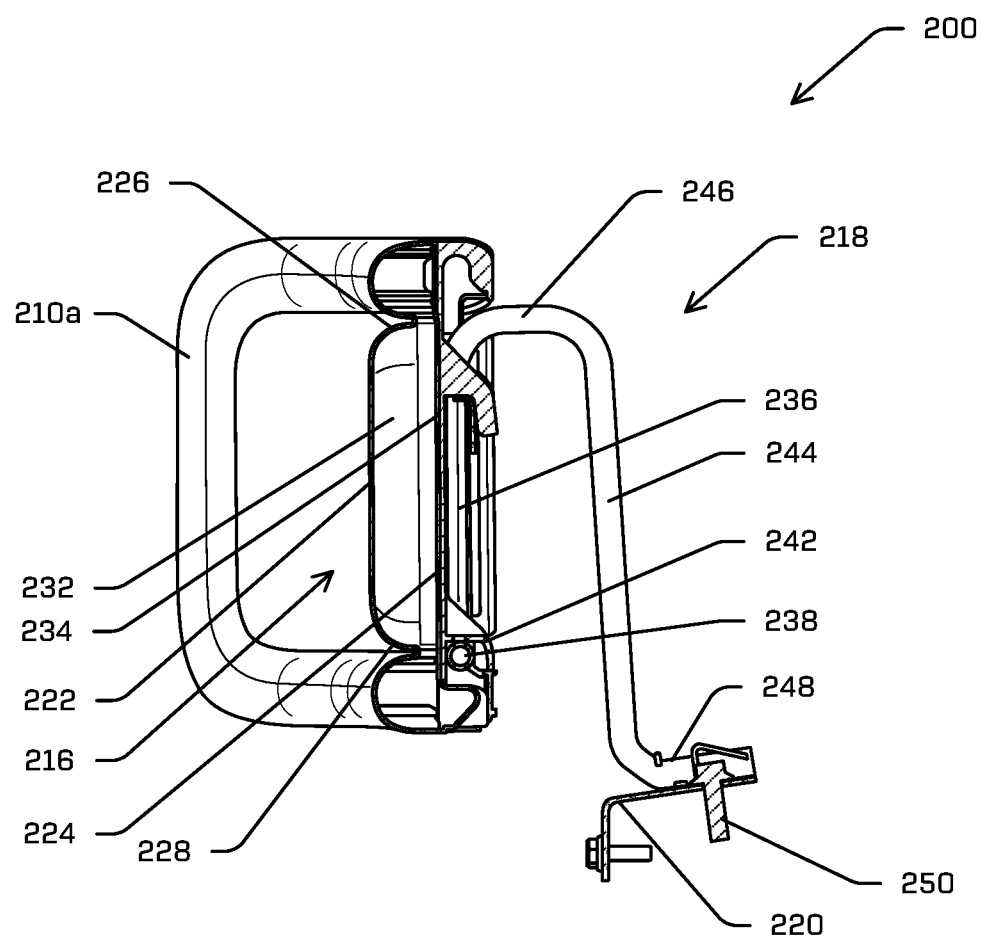
FIG. 2C is a section view of the example headrest of FIGS. 2A and 2B, taken along section line 2C-2C in FIG. 2A.

FIGS. 2A-2C illustrate an example headrest 200 in more detail. More specifically, FIG. 2A is a front isometric view of the headrest 200, FIG. 2B is a rear isometric view of the headrest 200, and FIG. 2C is a cross-sectional view of the headrest 200, taken along the section line 2C-2C in FIG. 2A. The headrest 200 may be an example of the headrest 104 illustrated in FIG. 1.

As illustrated generally by FIGS. 2A and 2B, the headrest 200 includes a first passenger headrest portion 202a and a second passenger headrest portion 202b. The first passenger headrest portion 202a and the second passenger headrest portion 202b are connected by an outer frame 204, which may be the same as or similar to the outer frame 114 of FIG. 1. In the illustration, the outer frame 204 comprises a top crossmember 206 and a bottom crossmember 208 substantially parallel to the top crossmember 206. The top crossmember 206 and the bottom crossmember 208 each extend generally laterally between opposite lateral sides 210a, 210b of the outer frame 204. In the illustrated example, the top crossmember 206 and the bottom crossmember 208 are bent or turned proximate the lateral sides 210a, 210b such that the top crossmember 206 and the bottom crossmember 208 are substantially U-shaped. In some examples, one or both of the lateral sides 210a, 210b may be configured for attachment to the vehicle, such as to lateral sides of the vehicle.

In examples, the top crossmember 206, the bottom crossmember 208, and/or the lateral sides 210a, 210b, can include generally rigid and elongated tubes or rods continuously formed or otherwise attached to form the outer frame 204. For example, the tubes may define an interior cavity and can have a generally circular, ovular, square, rectangular, or other cross-section. As also illustrated in FIG. 2A, a resilient material 212 may be formed on surfaces of one or more of the top crossmember 206, the bottom crossmember 208, and/or the lateral sides 210a, 210b. In some examples, the resilient material 212 can provide a softer or more comfortable surface for contacting the passenger. In at least some examples, the resilient material 212 can include a foam or other compressible material disposed on or integrally formed with the outer frame 204. Also in examples, the resilient material 212 can include a flexible sheet or membrane of material wrapped around and stretched taught over the rigid outer frame 204 and/or the foam or other compressible member.

In some examples, the top crossmember 206, the bottom crossmember 208, and/or the lateral sides 210a, 210b may be configured such that the outer frame 204 is a substantially continuous shape defining an opening 214 in which components of the first passenger headrest portion 202a and the second passenger headrest portion 202b are disposed. Stated differently, in the illustrated example, the first headrest portion 202a and the second headrest portion 202b may be disposed generally below the top crossmember 206, above the bottom crossmember 208, and between the lateral sides 210a, 210b. In other examples, the outer frame 204 may have discontinuities, e.g., at portions of the first passenger headrest portion 202a and/or at the second passenger headrest portion 202b. Also in examples, the lateral sides 210a, 210b may be optional. For example, distal ends of the top crossmember 206 and/or of the bottom crossmember 208 may be fixed directly to a vehicle in which the headrest 200 is used. Moreover, although the top crossmember 206 and the bottom crossmember 208 are shown as substantially U-shaped, in other implementations, these members may be shaped otherwise. For instance, the top crossmember 206 and the bottom crossmember 208 may be substantially linear. Moreover, the top crossmember 206 and the bottom crossmember 208 may be larger or smaller than illustrated. For example, although the headrest 200 is illustrated as including the first passenger headrest portion 202a and the second passenger headrest portion 202b, in other instances, the headrest 200 could include additional passenger headrest portions. For instance, the top crossmember 206 and the bottom crossmember 208 could be longer to span additional seats in the vehicle, and a number of additional passenger headrest portions commensurate with the number of additional seats could be disposed on the outer frame 204. In still further examples, the headrest 200 may include only a single passenger headrest portion, such as the first passenger headrest portion 202a or the second passenger headrest portion 202b. In these examples, the top crossmember 206 and the bottom crossmember 208 may be shorter, e.g. such that the lateral sides 210a, 210b are closer to each other than illustrated. In still further examples, the outer frame 204 may not be used at all. For instance, each of the first headrest portion 202a and the second headrest portion 202b may be entirely independent of each other.

As also illustrated in FIGS. 2A, 2B, and 2C, the first passenger headrest portion 202a and the second passenger headrest portion 202b are substantially identical. More specifically, each may include a resilient member 216 generally positioned to contact a passenger's head (as detailed further herein) and a coupling or frame 218 configured to mount the respective resilient member 216 to the vehicle in which the headrest 200 is used. As will be appreciated, the headrest 200 may not be directly coupled to the seatback with which the headrest 200 is intended to be used. Instead, the headrest 200 may be configured to be coupled directly or indirectly to a portion 220 of a frame or body of the vehicle via the frame 218. In other examples, the headrest 200 could be attached to the seat. In the illustrated embodiment, the portion 220 of the frame or body of the vehicle is illustrated as an angled portion having a substantially L-shaped cross-section. However, the illustrated angled portion is for example only, and represents any mounting surface associated with the frame or body of the vehicle. In examples, the headrest frame 218 may be secured to any surface or feature that maintains a position of the resilient member 216 and that allows the headrest 200 to function as described further herein.

As most clearly illustrated in FIG. 2C, the resilient member 216 may include a padding or other similar material that provides a degree of comfort to the user once seated. For instance, the passenger's head may comfortably rest against the resilient number 216 during normal operation of the vehicle. In more detail, the resilient member 216 may include a front surface 222 generally disposed to contact the back of the passenger's head and a rear surface 224 opposite the front surface 222. The resilient member 216 may also extend in a vertical dimension from a top surface 226 to a bottom surface 228. In the illustrated example, the resilient member 216 is curved or arcuate in cross-section proximate a junction of the front surface 222 and each of the top surface 226 and the bottom surface 228. As best shown in FIG. 2A, a similar contour may be provided between the front surface 222 and lateral sides 230 of the resilient member 216. The illustrated contours are for example only, as other contours may alternatively be used.

In some examples, the resilient member 216 of the headrest 200 can include a padded portion 232 mounted to or fixed to a backing 234. The backing 234 may provide a rigid structure that promotes attachment of the padded portion 232 and/or the frame 218. In some examples, the backing 234 can include mounting features, such as holes, slots, threaded bores, or the like that promote attachment of the padded portion 232 and/or the frame 218. The rear surface 224 can be a surface of the backing 234. Also in examples, a flexible sheet or membrane of material may be wrapped around and/or stretched taught over the padded portion 232 and/or the backing 234. The flexible sheet or membrane of material may at least partially define or construct the main surface front surface 222, the top surface 226, the bottom surface 228, and/or the lateral sides 230 of the headrest 200. Also in examples, such a film or membrane can also be wrapped around and/or stretched taught over the resilient material 212 discussed above. For instance, the film or membrane may provide a desired aesthetic for the first passenger headrest portion 202a, the second passenger headrest portion 202b, and/or the outer frame 204.

As detailed further herein, the resilient member 216 may be configured to have a first stiffness. For example, the resilient member 216, e.g., the padded portion 232 of the resilient member 216, may be configured to compress in response to a force between the passenger's head and the front surface 222 of the resilient member 216. For instance, a force may cause the front surface 222 of the resilient member 216 to move relatively closer to the rear surface 224, e.g., to reduce the thickness between the front surface 222 and the rear surface 224. In some examples, the resilient member 216, e.g., the padded portion 232, may be made of a polymeric material. For instance, the resilient member 216 may include a polymeric foam such as expanded polypropylene, expanded polystyrene, expanded polyethylene, or other foam material. Also in examples, the padded material 212 formed on at least a portion of the frame 204 can include similar or the same materials. In at least one example, the padded material 212 and the resilient member 216 (e.g., the padded portion 232 of the resilient member 216) can be formed of the same material. In some examples, the material may be uniform throughout the padded portion 232, or may otherwise have varying degrees of density, stiffness, etc. and/or have differing materials so as to achieve the desired force profile during impact to promote coupling of the passenger to the corresponding headrest.

As best illustrated in FIGS. 2B and 2C, each of the frames 218 can include a plurality of bent or otherwise contoured tubular numbers generally extending from the rear surface 224 to the portion 220 of the vehicle frame. For example, each of the frames 218 can include a pair of support legs 236 generally parallel to each other and extending along the rear surface 224 of the resilient member 216 from a position proximate a bottom of the rear surface 224 to a position proximate the top of the rear surface 224. As also illustrated, ends of the support legs 236 proximate the bottom of the rear surface 224 may be connected by a cross piece 238. Accordingly, together, the pair of support legs 236 and the cross piece 238 form a U-shape generally fixed to the rear surface 224 of the resilient member 216. In the illustrated example, a bracket 240 may be fixed to the rear surface 224, e.g. using fasteners, such as screws, bolts, or the like, and the bracket 240 may extend over at least a portion of the support legs 236 to maintain the support legs 236 against the rear surface 224. In some examples, the bracket 240 may be integrally formed with the rear surface of the resilient member. As also illustrated in FIG. 2C, the resilient member 216 may also include one or more slotted openings 242 configured to receive a portion of the cross piece 238. Thus, in the illustrated embodiment, the slotted openings 242 retain the cross piece 238 against the rear surface 224 and the bracket 240 retains the pair of support legs 236 against the rear surface 224. The bracket 240 and the slotted openings 242 or for example only. In other examples, the pair of support legs 236 and/or the cross piece 238 may be fixed or otherwise secured directly to the rear surface 224. By way of nonlimiting examples, one or more holes may be formed through the support legs 236 and/or the cross piece 238 and bolts or similar fasteners may be passed through such holes and threaded into or otherwise secured to the rear surface 224 of the resilient member 216.

As best illustrated in FIGS. 2B and 2C, the frame 218 also includes a pair of offset legs 244 spaced from the support legs 236 by a distance away from the rear surface 224 of the resilient member 216. In the illustrated embodiment, the offset legs 244 are generally parallel to the support legs 236, e.g., within about 5°, although in other implementations, the offset legs 244 may be differently angled relative to the support legs 236 and/or the rear surface 224 of the resilient member 216. Intermediate members 246 connect to the support legs 236 to the offset legs 244. In the illustrated example, the intermediate number 246 as a continuous piece extending from a top of the support legs 236 to a top of the offset legs 244. The intermediate member 246 may have a portion that is substantially perpendicular to one or both of the support leg 236 and the offset leg 244.

Accordingly, each of the support legs 236 is connected to one of the offset legs 244 by one of the intermediate members 246 such that the support leg 236, the intermediate member 246, and the offset leg 244 forms an inverted U-shape. Although the inverted U-shape shows that a portion of the intermediate member 246 is substantially horizontal, with arcs or bends between the substantially horizontal portion and the respective support leg 236 or the offset leg 244, the intermediate member 246 may take different shapes. In at least one example, the intermediate member 246 may comprise an arc over its entire length, e.g., such that the intermediate member 246 does not include a substantially horizontal portion. As described further below, in some instances in which a force is applied against the front surface 222 of the resilient member 216, e.g., by a passenger's head, the frame may bend about the intermediate members 246. For instance, the support leg 236 may move to be closer to the offset leg 244 than illustrated in the embodiment of FIGS. 2A, 2B, and 2C, an example of which is illustrated in FIG. 5C.

The frame 218 illustrated in FIGS. 2A, 2B, and 2C also includes a pair of mounting members 248, each proximate a bottom of one of the offset legs 244. As illustrated, each of the mounting members 248 is angled relative to the respective support leg 236 with which it is associated. In the illustrated embodiment, the mounting member 248 may be formed at a substantial right angle relative to the offset leg 244. The mounting members 248 can be secured to the portion 220 body or frame of the vehicle in which the headrest 200 is installed. Although a bolt 250 is shown as securing the mounting members 248 to the portion 220 of the body or frame, other fastening means also are contemplated and will be appreciated by those having ordinary skill in the art. In operation, and as will be described in more detail below, a junction 250 of the offset leg 244 and the mounting member 248 may define a deformation portion about which deformation may occur in response to a force applied at the front surface 222 of the resilient member 216.

Although illustrated in the figures as being formed at an angle relative to the offset leg 244, the mounting member 248 may be differently formed. For instance, the size, shape, and/or orientation of the mounting member 248 can be dependent upon the structure (e.g., a portion of the vehicle) to which the frame 218 is being fixed. In one non-limiting example, the mounting member 248 may be incorporated into a distal end of the offset leg 244, e.g., such that the mounting member 248 is an extension of the offset leg 248 with or without a discernible junction. Also in embodiments, the means of attaching the mounting member 248 can be varied. For instance, screws, bolts, rivets, clips, or similar fasteners can be used, whereas the frame 216 may be formed integrally with a portion of the vehicle. In some implementations, any arrangement that fixes the frame relative to the vehicle may be used.

In implementations, the frame 218 may be a substantially continuous structure. For example, the support legs 236, the crossmember 238, the intermediate members 246, the offset legs 244, and the mounting members 248 may be an integral and continuously formed structure. In some examples, the frame 218 may be formed from one or more rods or tubes form to include the various sections described herein. For instance, the rods or tubes may be formed from metal, metal alloys, polymers, carbon fiber, or other materials. For example, the rods or tubes may be hollow, as shown by the cross-section of the cross piece 238 in FIG. 2C. Also in examples, portions of the frame may be formed of different materials. In at least some examples described herein, the support legs 236, the crossmember 238, the intermediate members 246, and at least a portion of the offset legs 244 may be formed of a first material having a first stiffness. In contrast, a remainder or other portion of the offset legs 244 and the mounting members 248 may be formed of a second, different material, which may have a second stiffness. In examples, the first stiffness may be less than the second stiffness. Accordingly, and as described further below, when the passenger's head is driven into the resilient member 216, e.g. in the event of a crash originating behind the seated passenger, the frame 218 may be configured to bend about a portion 252 of the intermediate member 246 at a first force and may be configured to bend about the transition 250 from the offset leg 244 to the mounting member 246 in response to a second force, greater than the first force. In some examples, the first material and the second material may be substantially the same, but geometries of the portions may be varied in order to achieve desired material properties (e.g., elasticity, etc.). By way of nonlimiting example, the relatively stiffer portion of the frame 218 may be formed from a tubular material having a first wall thickness and the second, relatively less stiff portion may be formed from a tubular material having a second wall thickness less than the first wall thickness. In other examples, the relatively stiffer portion may be formed from a solid tubular member, whereas the relatively less stiff portion may be formed from a hollow tubular member.

Modifications to the frames 218 illustrated in FIGS. 2A, 2B, and 2C also are contemplated. By way of nonlimiting example, in at least some examples, the cross piece 238 may not be provided. For example, the support legs 236 may not be coupled by a portion of the frame 218. Also in examples, the frame 218 may not include pairs of the support legs 236, the intermediate members 246, the offset legs 244 and the mounting members 248. For example, each frame 218 may include only a single support leg 236, a single intermediate number 246, a single offset leg 244, and a single mounting number 248. In such examples, the single occurrence of such members may be centrally located relative to a width of the passenger headrest portion 202a, 202b. Also in such examples, the support leg 236, the intermediate member 246, the offset leg 244, and the mounting number 248 may have a larger cross-section and/or different cross-section. For example, different cross-sections may be provided such that the frame 218 retains a minimum structural rigidity while performing in accordance of aspects of this disclosure. Also in implementations, distal ends of the mounting members 248 may be fixed to each other, e.g. prior to securing the frame 218 to the portion 220 of the vehicle frame or body. Although not illustrated, a crossmember like the crossmember 236 may be provided between distal ends of the mounting members 248.

Figure 3:
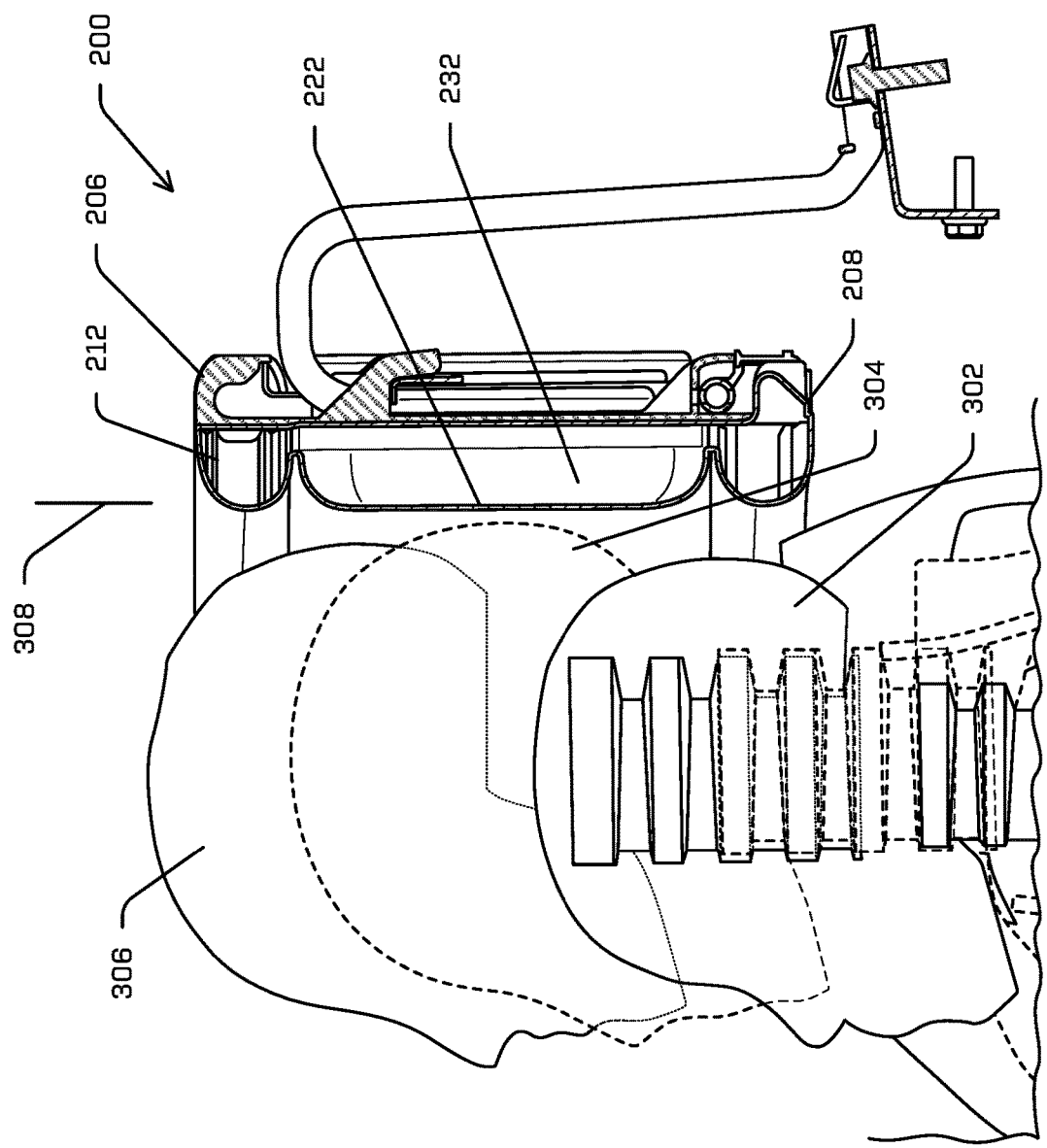
FIG. 3 is a section of view of the headrest as shown in FIG. 2C, further illustrating example passengers, as described herein.

FIG. 3 illustrates the cross-sectional view of FIG. 2C, with the addition of representations of passengers. More specifically, FIG. 3 shows a first passenger head 302 (represented as a crash test dummy), a second passenger head 304, and a third passenger head 306 relative to the headrest 200, e.g., when the respective passengers are seated in the vehicle. In some examples, the passenger heads 302, 304, 306 may correspond to statistical representations of different passenger types. For instance, the first passenger head 302 may correspond to a representation of a passenger in a $5^{th}$ percentile of height and/or weight, the second passenger head 304 may correspond to a representation of a passenger in a $50^{th}$ percentile of height and/or weight, and the third head 306 may correspond to a representation of a passenger in a $95^{th}$ percentile of height and/or weight. As illustrated, each of the passenger heads 302, 304, 306 is arranged proximate the front surface 222 of the resilient member 216 when the passenger is seated. As also illustrated, a height of the headrest, e.g., including the padded portion 232 of the resilient member 216 and the padded material 212 fixed to the outer frame 204 are configured to provide support between each of the passenger heads 302, 304, 306 and the headrest 200.

As also illustrated in FIG. 3, each of the padded material 212 on the top crossmember 206, the padded portion 232 of the resilient member 216, and the padded material 212 on the bottom crossmember 208 are configured to extend generally to a similar horizontal dimension. For example, in the illustration, each of these portions has a horizontal extent terminating proximate a vertical line 308. However, this disclosure is not limited to such an arrangement. In some examples, the front surface 222 of the resilient member 216 and/or the resilient material 212 on either or both of the top crossmember 206 and/or the bottom crossmember 208 may be differently configured. By way of nonlimiting example, in the illustration, the first head 302 is relatively forward, e.g., in a horizontal direction, of the second head 304 and the third head 306. In some implementations, it may be desirable to maintain a predetermined, e.g., minimum or maximum distance between each of the passenger heads 302, 304, 306 and the portion of the headrest 200 with which the respective head will contact the headrest 200. Accordingly, in some examples, the resilient material 212 disposed on the bottom crossmember 208 may extend further from the back surface 224 in the horizontal direction than some or all of the front surface 222 of the resilient member 216. Also in implementations, the front surface 222 of the resilient member 216 may be contoured, e.g., such that different portions of the front surface 222 extend different distances from the rear surface 224 in the horizontal direction. In at least some examples, the resilient number 216 may have a varied thickness along its vertical dimension, e.g., between the top surface 226 in the bottom surface 228. Also in examples, the top crossmember 206 and the bottom crossmember 208 may be spaced further apart, e.g., in the vertical direction, such that each of the heads 302, 304, 306 is configured to contact the resilient member 216, e.g., instead of the resilient surface 212 disposed on the top crossmember 206 and the bottom crossmember 208. In such examples, the resilient member 216 may extend in a vertical direction from the top crossmember 206 to the bottom crossmember 208, as in the illustrated example.

Figure 4:
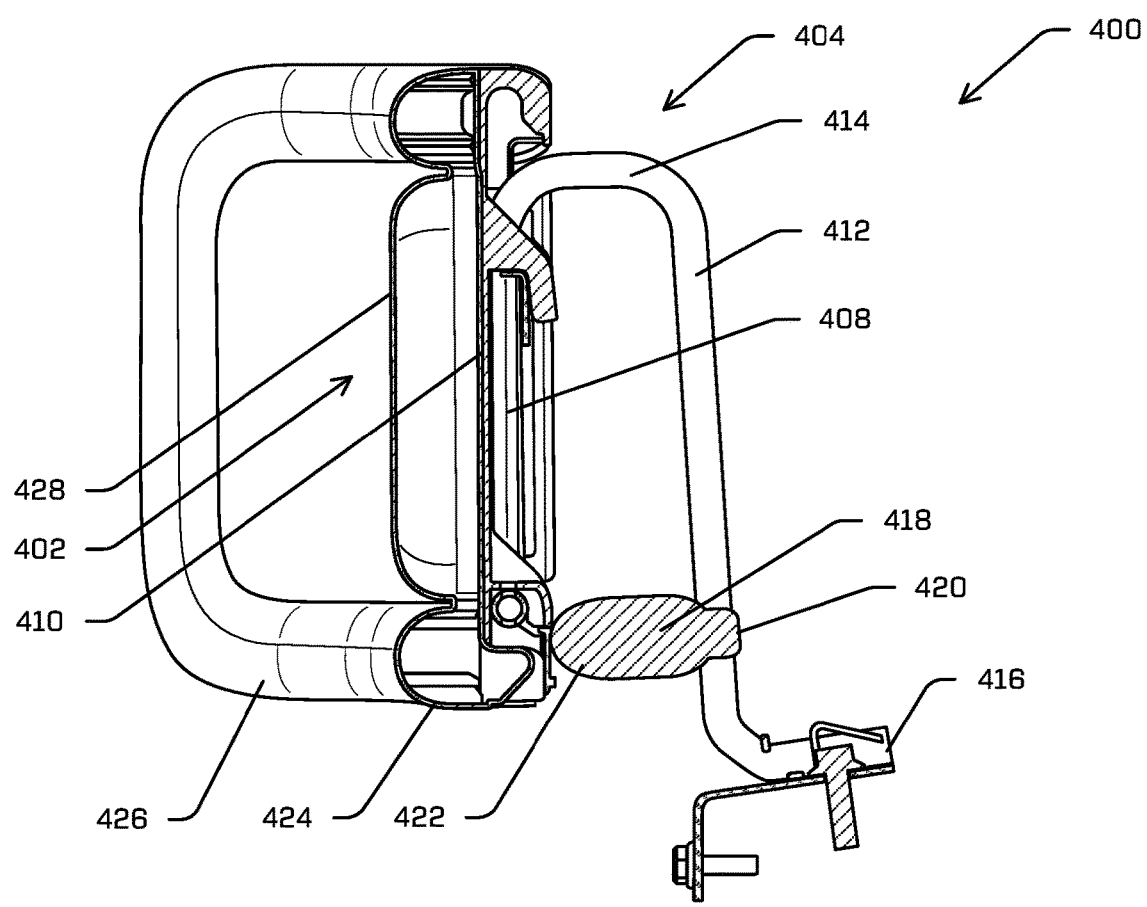
FIG. 4 is a section view illustrating another example headrest, as described herein.

FIG. 4 illustrates another example headrest 400 according to additional implementations of this disclosure. The headrest 400 may be substantially similar to the headrest 200 detailed above. More specifically, the headrest 400 includes a resilient member 402 and a frame 404 configured to secure the resilient member 402 to a portion 406 of a frame or body of a vehicle in which the headrest 400 is mounted. The resilient member 402 may be substantially similar to the resilient member 216 and the frame 404 may be substantially similar to the frame 218. For instance, like the frame 218, the frame 404 generally includes a first, support leg 408 secured to (or relative to) a rear surface 410 of the resilient member 404 and an offset leg 412 spaced from the support leg 408. An intermediate member 414 connects the support leg 408 to a first, e.g. top, end of the offset leg 412, and a mounting member 416 is provided at an opposite, e.g., bottom, end of the offset leg 412.

Unlike the frame 218, however, the frame 404 includes a second resilient member 418 positioned generally between the resilient member 402 and the offset leg 412. The second resilient member 418 may be secured to the offset leg 412 proximate a first, e.g., rear, side 420 of the second resilient member 418. An opposite, e.g., front, side 422 of the second resilient member 418 may be in contact with or secured to the rear surface 410 of the resilient member 402, the support leg 408, and/or a lower cross member 424 of an outer frame 426 of the headrest 400. In other instances, however, the front side 422 may be spaced from one or more of the rear surface 410 of the resilient member 402, the support leg 408, the crossmember (not shown) extending between the illustrated support leg 408 and another support leg 408, and/or the lower crossmember 424 of the outer frame 426. Also in examples, the front side 422 of the second resilient member 418 can be secured to one or more of the rear surface 410 of the resilient member 402, the support leg 408, and/or a lower cross member 424 of an outer frame 426 of the headrest 400, and the back end 420 can be spaced from the offset leg 412. As detailed further herein, the second resilient number 418 may provide additional resistance against a force applied by a passenger's head and a front surface 428 of the resilient member 402. In some examples, the second resilient member 408 can be formed of any of the materials described above in association with the resilient member 216 and/or the resilient material 212. As detailed further herein, the second resilient member 418 may limit deformation of the support leg 408 relative to the offset leg 412, e.g., when the frame 404 deforms by rotating about the intermediate member 414.

FIGS. 5A-5D illustrate aspects of another example headrest 500 when a vehicle in which the headrest 500 is mounted experiences a collision event. More specifically, FIGS. 5A-5D illustrate a plurality of scenarios that may be successive in time or resulting from serially higher applied forces, illustrating an interaction of a passenger 502 (illustrated as a crash test dummy) with the headrest 500 at various times throughout the collision event. In the illustrated example, the passenger 502 is seated in a seat 504, although in other implementations the passenger may be standing or otherwise positioned relative to the headrest 500. Although FIGS. 5A-5D show only a single passenger and a single headrest, as in examples described herein, the headrest 500 may include additional headrest portions, e.g., for one or more additional passengers seated next to the passenger 502.

Figure 5A:
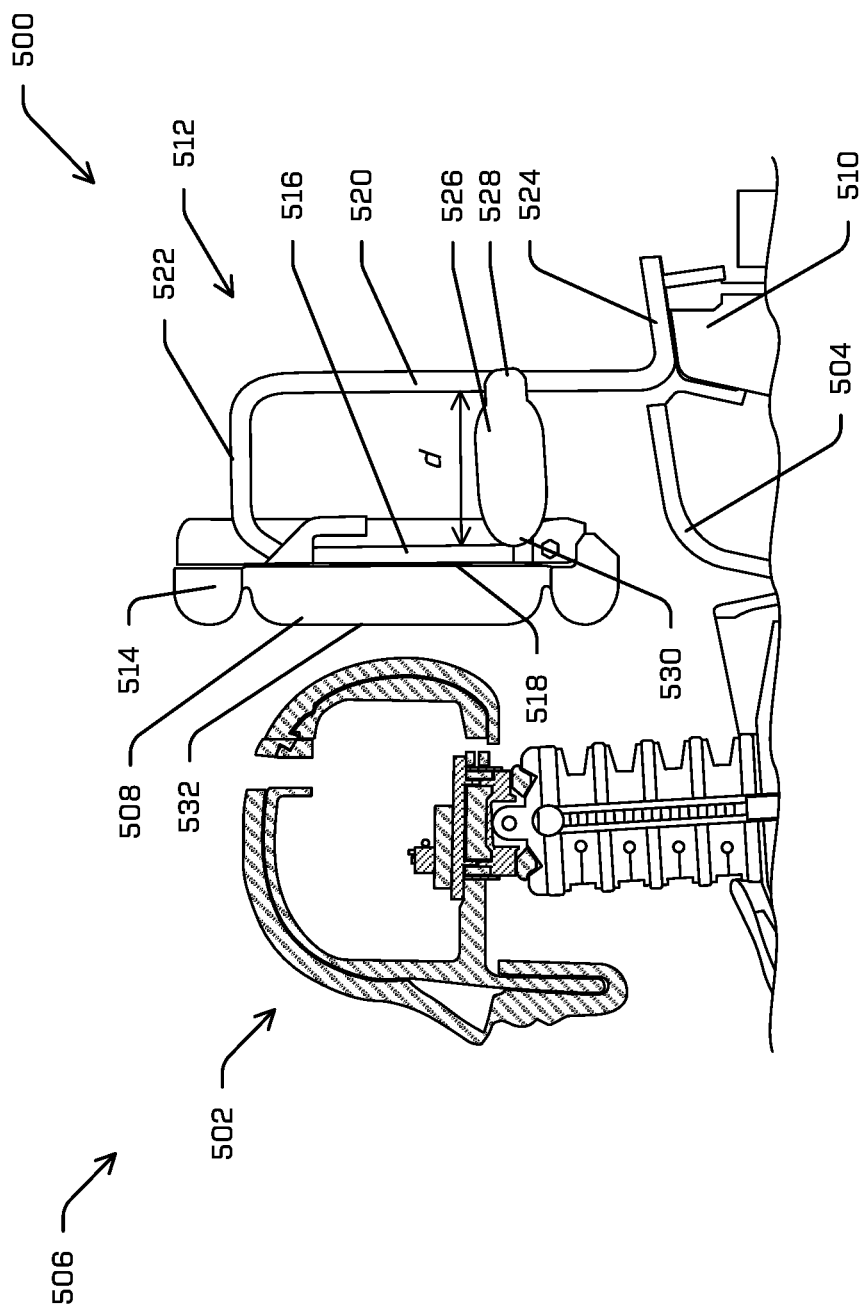
FIGS. 5A-5D illustrate relationships of a passenger sitting in a seat of a vehicle and having a headrest according to examples described herein, in various states of a collision event including the vehicle, as described herein.

FIG. 5A shows the headrest 500 and the passenger 502 from the side in a first scenario 506. In this example, the headrest 500 may be substantially the same as the headrest 104, the headrest 200, and/or the headrest 400 discussed above. For example, the headrest 500 may include a resilient member 508 secured to a portion 510 of a vehicle by a coupling or frame 512. As also illustrated, the headrest 500 can include an outer frame 514 to which the resilient member 508 is secured. In some examples, the outer frame 514 may be similar to or the same as the outer frame 204 and/or the outer frame 426 detailed above. For instance, the outer frame 514 can extend laterally from the top and/or bottom of the resilient member 508 (e.g., into and/or out of the page in FIG. 5A) to one or more additional resilient members, like the resilient member 508. In this way, the outer frame 514 may act to couple a plurality of instances of the resilient member 508, e.g., to provide headrests for a plurality of adjacent seats. As in other examples described herein, the resilient member 508 (and in some instances the outer frame 514) can provide one or more padded or cushioned surfaces intended for contact with the head (e.g., the back of the head) of the passenger 502.

The coupling or frame 512 generally includes a plurality of portions fixed relative to each other to form a generally arcuate frame member. In the example, the frame 512 includes a first, support leg 516 secured proximate a back surface 518 of the resilient member 508 and an offset leg 520 spaced from the support leg 516 by a horizontal distance d. In some instances, the distance d may be determined based on a desired position of the passenger's head and/or the arrangement of the frame 512. In at least some examples, the distance d may be configured to generally align the resilient member with a back of the seat 504. An intermediate member 522 connects a top of the support leg 516 and a top of the offset leg 520. Moreover, a mounting member 524 may be formed proximate a bottom of the offset leg 520 for securing the frame 512 to the portion 510 of the vehicle. In some examples, the portion 510 of the vehicle can be a portion of the seat 504, although in other examples, the portion 510 of the vehicle can be a portion of the vehicle's frame or other rigid component. Thus, in the examples of FIGS. 5A-5D, the frame 512 may be substantially the same as the frames 218, 404, described herein, and the frame 512 can include any of the modifications described herein and associated with those other frames 218, 404. For instance, although only a single support leg 516, a single intermediate member 522, a single offset leg 520, and a single mounting member 524 are illustrated in FIG. 5, one or more additional instances of these elements may also be associated with the resilient member 508. In at least some instances, and similar to the example illustrated in FIGS. 2A, 2B, and 2C, the illustrated support leg 516, the intermediate member 522, the offset leg 520, and the mounting member 524 may be one of a pair associated with the resilient member 508. In some examples, the pairs may be spaced from each other along a width of the resilient number 506 (e.g., into or out of the page). Also, the support legs 516 may be attached or otherwise coupled to each other, e.g. via a crossmember, such as the crossmember 238 discussed above.

As also illustrated in FIG. 5A, the frame 512 may also include a second resilient member 526 generally disposed between the resilient member 508 and the offset leg 520. For example, a first, e.g., rear side 528 of the second resilient member 526 may be fixed to the offset leg 520. A second, e.g., opposite or front, side 530 may be disposed generally closer to the rear surface 518 of the resilient member 508. Although in the illustrated embodiment the first side 528 contacts (and may be fixed to) the offset leg 520 and the second side 530 contacts (and may be fixed to) the support leg 516, in other examples the second side 530 may be in contact with (or fixed to) the resilient member 508, the outer frame 512, and/or some other structure proximate the back surface 518 of the resilient portion 508. In still further examples, the length of the second resilient member 526 may be smaller, e.g., the distance between the first side 528 and the second side 530 may be smaller such that one of the sides 528, 530 is fixed and the other is free (and potentially spaced from all other components of the headrest 500).

In the first scenario 506, the passenger 502 is in a generally upright position. For example, the passenger 502 may be seated in the seat 504. The passenger 502 may be wearing a restraint (not shown), such as a seatbelt or the like, that maintains the passenger 502 generally in the position shown. In the illustrated position, the back of the head of the passenger 502 is spaced by some distance from a front surface 532 of the resilient member 508. In other implementations, the passenger 502 may rest her head on the front surface 532 of the resilient member 508, e.g., by reclining or otherwise moving her head toward the front surface 532.

Figure 5B:
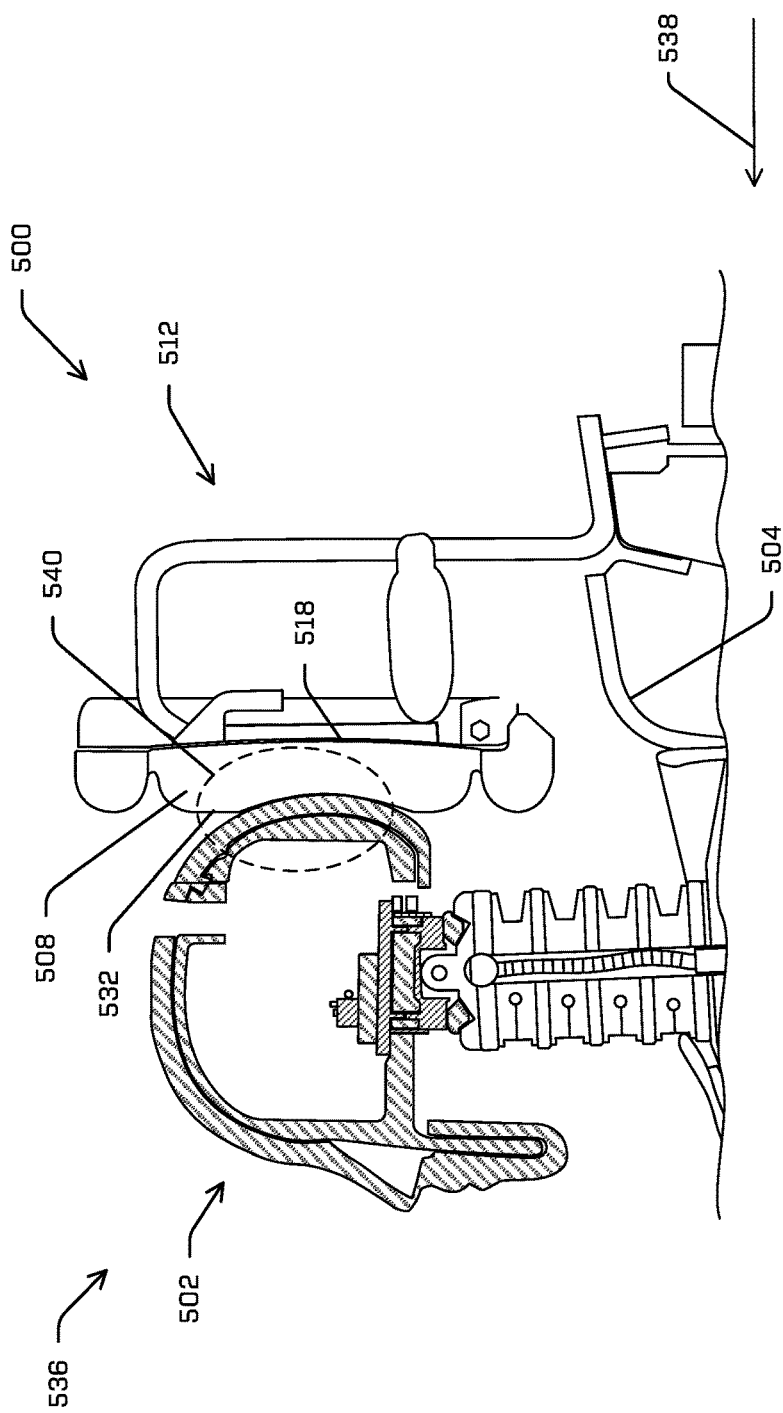
Figure 5C:
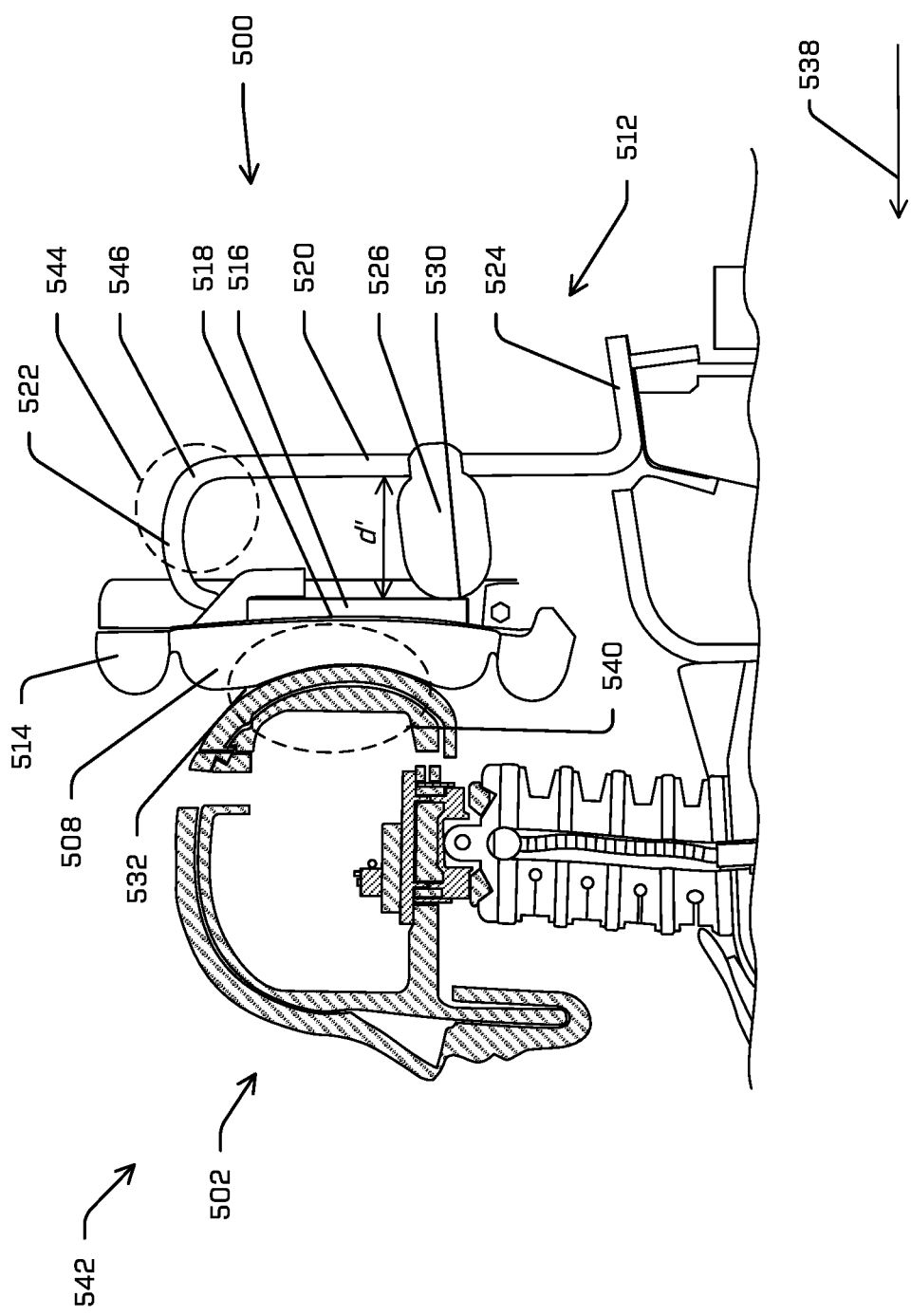

FIG. 5B illustrates a second scenario 536 in which the vehicle in which the passenger 502 is traveling has experienced a collision event. For example, the collision event may result in a force being imparted on the vehicle generally in the direction of arrow 538, e.g., from behind the passenger 502. In some instances, the passenger 502 may be facing in a forward direction, e.g., the car may be configured to travel forward in the direction indicated by the arrow 538, and the collision event may be the result of the vehicle being rear-ended or the vehicle backing into an obstacle. In still further examples, the vehicle in which the passenger 502 is travelling may be configured to travel forward in a direction opposite the direction of the arrow 538. In such an example, the passenger 502 may be configured to travel in a rear-facing direction, and the vehicle may be involved in a head-on collision or otherwise run into an obstacle in front of the vehicle.

Regardless of the cause of the collision event, the collision event may impart a force on the vehicle that causes the back of the passenger's head to contact the front surface 5324 of the resilient member 508. In the illustrated example, this first minimum application of force is sufficient that the resilient member 508 deforms, e.g. by compressing at an area or location 540 at which the back of the head of the passenger 502 contacts the resilient member 506. In the illustrated example, at the location 540, a thickness of the resilient member 508, e.g., a distance between the front surface 532 and the rear surface 518 is reduced. In examples described herein, the resilient number 508 may include a compressible foam or polymeric material, and the material may be selected to compress a certain distance under a predetermined force, such as the force causing the second scenario 536.

As described, the second scenario 536 may be the result of a first minimum application of force between the head of the passenger 502 and the resilient member 508 that is sufficient to compress the resilient member 508. In the second scenario 536, however, the force between the head 514 and the resilient member 508 is insufficient to otherwise deform the headrest 500. Thus, for example, the second scenario 536 may result from a low-impact crash or collision event or may be a first phase in a higher-impact collision event.

In contrast, FIG. 5C illustrates a third scenario 542 in which a force of the collision event, e.g. the force between the head of the passenger 502 and the resilient member 508, has increased. For example, the third scenario 542 may be subsequent in time to the scenario 536. Accordingly, the third scenario 542 may be associated with a second or next phase in a higher impact crash event, e.g., subsequent to the first phase illustrated in the second scenario 536. As illustrated in FIG. 5C, not only is the resilient member 508 deformed at the location 540, but the frame 512 also has begun to deform. More specifically, the support leg 516 has been displaced relatively closer to the offset leg 520, such that the support leg 516 is spaced a distance d' (less than the distance d illustrated in FIG. 5A) from the offset leg 520. In examples, the frame 512 may be deformed by a bending proximate the intermediate member 520, e.g., at a bending location 544 shown in FIG. 5C. In this example, the passenger's head is effectively coupled to the resilient member 508, such that the force of the head of the passenger at the area of impact 540 creates a moment at a connection 546 between the intermediate member 522 and the offset leg 520 that causes distal ends (e.g., relative to the intermediate member 522—bottom ends in the illustrated orientation) of the support leg 516 and the offset leg 520 to rotate relative to each other, e.g., about the intermediate member 522, at the bending location 544.

As also illustrated in the third scenario 542, as a result of the deformation of the frame 510 at the bending location 544, the second resilient member 526 also begins to deform, e.g., by compressing the first and second sides 528, 530 relatively closer. As noted above, in some implementations, the second (e.g., front) side 530 of the second resilient member 526 can be horizontally spaced from the resilient member 508, the outer frame 514, and the support leg 516. In some such examples, in the third scenario 542, a portion of the resilient member 508, the outer frame 514, and/or the support leg may move relative to the second resilient member to contact the second side 530.

In some examples, the second resilient member 526 is optional. For example, the implementation discussed above in connection with FIGS. 2A, 2B, and 2C did not include a second resilient member. However, in implementations, the second resilient member 526 may provide a desired stiffness, e.g., to act as a block or hinderance to prevent excessive rotation of the mounting leg 516 relative to the offset leg 520. For instance, in an implementation that does not include the second resilient member 526, rotation about the bending location 544 may be sufficient to cause a lower portion of the resilient member 508, e.g., the bottom of the outer frame 514 and/or a bottom end of the support leg 516, to come into contact with the offset leg 520. Such an over-rotation about the bending location 544 may be more likely to happen with relatively shorter passengers, e.g., the $5^{th}$ percentile passenger illustrated in FIG. 3, because the force applied by the head is relatively farther away from the bending location 544, resulting in a larger moment about the bending portion 544. Such over-rotation may be undesirable as it may cause excessive rearward rotation of the neck of the passenger 502.

As will be appreciated, the third scenario 542 results from a relatively greater minimum application force than an application of force that causes the second scenario 536. To achieve the deformation of the frame 510 at the bending location 544 in the third scenario 542, the inverted U-shaped structure defined by the support leg 516, the intermediate member 522, and the offset leg 520 has a greater rigidity or stiffness than the resilient member 508. As detailed herein, the support leg 516, the intermediate member 522, and at least a portion of the offset leg 520 proximate the intermediate member 522 can be formed of a single tube or rod, bent or otherwise formed into the illustrated shape.

Figure 5D:
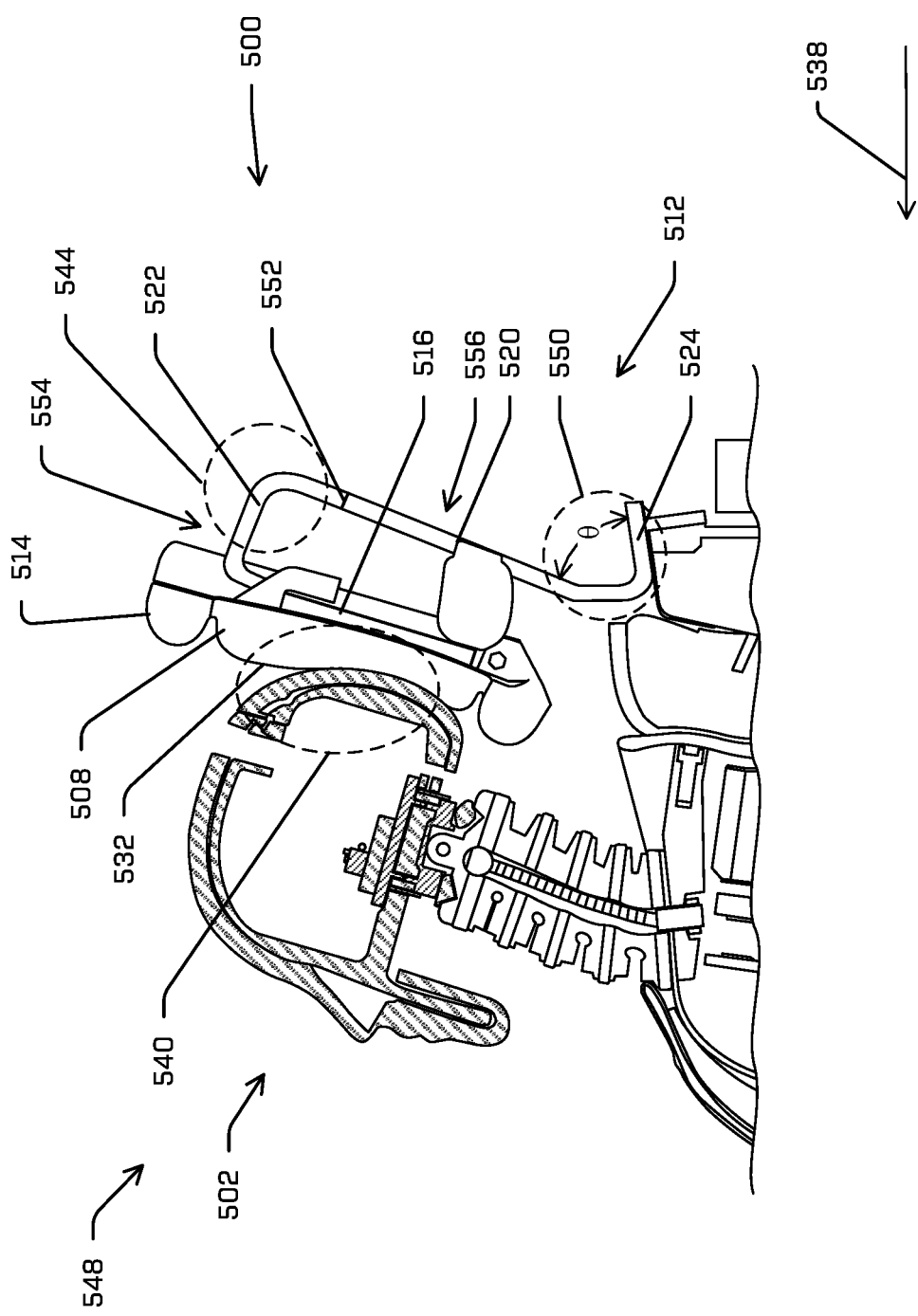

FIG. 5D illustrates a fourth scenario 548 subsequent in time to the third scenario 542, and/or in which a force of the collision event, e.g. the force between the head of the passenger 502 and the resilient member 508 has increased further. Accordingly, the fourth scenario 548 may be associated with a third or next phase in a higher impact crash event, e.g., subsequent to or resulting from a higher applied force than both the first phase illustrated in the second scenario 536 and the second phase illustrated in the third scenario 542. As illustrated in FIG. 5D, the frame 512 has now begun to deform proximate a deformation region 550, e.g., proximate a junction between the offset leg 520 and the mounting member 524. Here, a portion of the frame 510 including the mounting member 524 and the offset leg 520 are caused to rotate relative to each other such that an angle θ is reduced. In this example, as the angle θ decreases, the head of the passenger 502 rotates backward, e.g., about the passenger's neck. In implementations, it may be desirable to limit a rotation of the passenger's neck, but such may be unavoidable in higher impact events.

In examples, the headrest 500 only deforms as in the fourth scenario 548 in the presence of a minimum application of force that is relatively higher than the forces that result in the second scenario 536 and the third scenario 542. For example, the mounting member 524 and at least a portion of the offset leg 520 may be formed of a material having a stiffness greater than a stiffness of a material used to form other portions of the frame 512. In the example of FIG. 5D, a joint 552 may identify a split between materials used to form the frame 510. In this example, a first portion of the frame 510 is identified by a reference numeral 554 and a second portion of the frame 510 is identified by a reference numeral 556. In this example, the first portion 554 is formed by a first material having a first stiffness and the second portion 556 is formed by a second material having a second stiffness different from, e.g., greater than the first stiffness. The joint 552 is for illustration only, and may be formed anywhere along the length of the offset leg 520, or otherwise optional in those examples in which an integrally formed member having differing material properties is used.

Accordingly, FIGS. 5A-5D illustrate a sequence of scenarios associated with a collision event. As shown, the example design provides for multiple stages of deformation, generally associated with different forces experienced by the passenger 502. According to examples, such a multi-phase deformation may increase safety outcomes for the passenger 502, e.g., by maintaining proper head and neck positioning during a rear impact and/or controlling accelerations experienced by the head of the passenger 502.

Moreover, although the FIGS. 5A-5D generally illustrate a passenger of a single height and weight, e.g., a passenger associated with a $50^{th}$ percentile of passengers, the headrest 500 provides similar outcomes for relatively taller and shorter passengers, without the need (or ability) to adjust a height of the headrest 500. That is, despite the headrest 500 being fixed relative to the seat 504 and/or the vehicle, the headrest 500 with multiple phases of deformation can benefit passengers of all sizes, e.g., by first absorbing the force at the resilient member 508 in response to a first force, then deforming about the bending portion 544 in response to a relative greater force, and finally deforming about the deformation region 550 under a still greater force. In implementations described herein, the resilient member 508 may be sized to contact passengers of various sizes, e.g., ranging from a $5^{th}$ percentile or lower to a $95^{th}$ percentile or higher, without the ability (or need) for adjustment.

Figure 6:
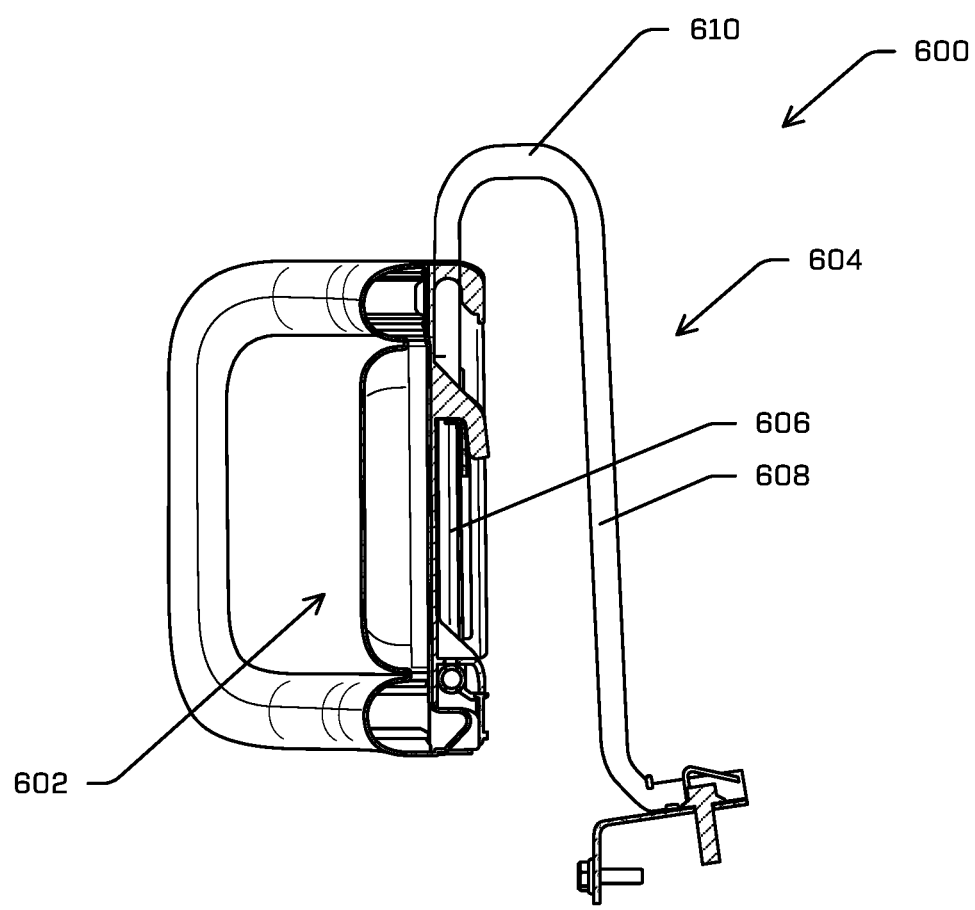
FIG. 6 is a side view of another example headrest according to examples described herein.

As noted above, the Figures are for example only; modifications and alterations also are anticipated. For instance, FIG. 6 illustrates another example headrest 600 including a resilient member 602 configured for contact with a passenger's head and a frame 604 configured to secure the resilient member 602 relative to a seat (not shown). The headrest 600 includes many of the features of other example headrests described herein, except that a portion of the frame 604 extends higher than illustrated in the previous Figures, and higher than the resilient member 602. In more detail, in this example, the frame 604 includes a first, support leg 606, a second, offset leg 608, and an intermediate member 610 extending between the support leg 606 and the offset leg 608, similar to other examples. However, the support leg 606 and the offset leg 608 extend above a top of the resilient member 602, such that the intermediate member 610 is also above the top of the resilient member 602. In examples, the arrangement of FIG. 6 may provide different bending in a scenario similar to the third scenario 542. By way of non-limiting example, the headrest 600 can result in a greater range of deformation, and, in some instances, at a relatively lower force. For instance, because the intermediate member 610 is relatively farther away, a force on the resilient member 602 may result in a greater moment proximate the intermediate member 610, e.g., relative to a similar force imparted on the headrest 500.

Figure 7:
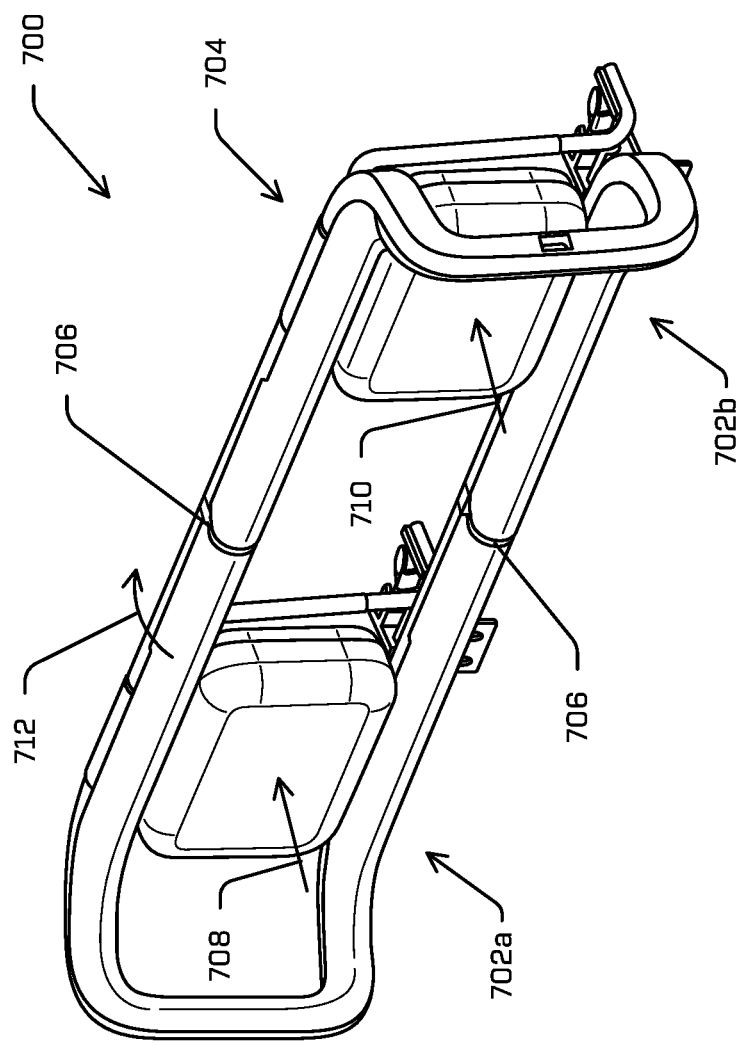
FIG. 7 is a perspective view of a still further example headrest according to additional examples, as described herein.

As described herein, example headrests can include more than one passenger headrest portion. For example, FIGS. 2A and 2B show the first passenger headrest portion 202a and the second passenger headrest portion 202b. The two passenger headrest portions 202a, 202b are coupled via the outer frame 206. Such a coupling, however, may alter the functioning of the headrest portions 202a, 202b, e.g., relative to the functioning illustrated in, and described with reference to, FIGS. 5A-5D. By way of non-limiting example, because the passenger headrest portions 202a, 202b are connected, a force imparted on one may impact the other. Such a connection may be beneficial in some instances, e.g., because it may provide a combined resistivity to torsion and/or other forces. However, in other instances the connection may be less desirable. For example, consider a scenario in which a large parent is sitting next to his/her young child in side-by-side seats. Although the passenger headrest portions 202a, 202b are configured to mitigate harm to both of the passengers, deflection of the headrest associated with the larger parent can also be transmitted to the headrest portion associated with the child, which may have adverse effects. FIG. 7 depicts another example headrest 700, similar to the headrest 200, but with functionality to mitigate unwanted outcomes resulting from coupling the passenger headrest portions.

In more detail, FIG. 7 illustrates the headrest 700 as being substantially the same as the headrest 200, generally including a first passenger headrest portion 702a and a second passenger headrest portion 702b and an outer frame 704 generally connecting the first passenger headrest portion 702a to the second passenger headrest portion 702b. As in other examples, the outer frame 704 may comprise a generally continuous frame that extends above and below the first and second passenger headrest portions 702a, 702b. Unlike other examples, however, the outer frame 704 may include one or more weakened sections 706 formed between the first and second passenger headrest portions 702a, 702b. For example, the weakened sections 706 can include a region with a reduced wall thickness, a scored section, or some other feature that promotes separation of segments of the outer frame 704 at the weakened section 706 in response to a predetermined force.

In FIG. 7, in response to a collision event, a first force may be applied to the first passenger headrest portion 202a generally along the direction 708. In this example, the first force may be greater than a second force applied at the second passenger headrest portions 202b, e.g., generally along the direction 710. In this example, the first force is sufficiently greater than the second force that the for first headrest portion 202a may deform, as in FIG. 5C and/or FIG. 5D. The same deformation may not occur at the second passenger headrest portion 202b, such that a rotation of the first headrest portion 702a relative to the second headrest portion 702b, e.g., about the arrow 712 occurs. In examples, when the rotational force along the arrow 712 is sufficiently large, the outer frame can break or separate at the weakened portions 706, thereby allowing the movement of the first passenger headrest portion 702a to be decoupled from the second passenger headrest portion 702b.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and components are disclosed as exemplary forms of implementing the claims.

EXAMPLE CLAUSES

A: An example headrest for a seat of a vehicle, the headrest including: a resilient member comprising a front surface arranged to contact a head of a passenger in the seat and a rear surface opposite the front surface; and a frame extending between the resilient member and a portion of the vehicle to secure the resilient member relative to the vehicle, the frame comprising: a first leg secured to the back surface of the resilient member; a second leg spaced from the first leg; and an intermediate member extending between the first leg and the second leg proximate a top of the frame, wherein: a portion of the resilient member is configured to compress in response to a first minimum application of force between the head of the passenger and the front surface of the resilient member, the first leg is configured to displace toward the second leg in response to a second minimum application of force between the head of the passenger and the front surface of the resilient member, the second minimum application of force being greater than the first minimum application of force, and the second leg is configured to bend in response to a third minimum application of force between the head of the passenger and the front surface of the resilient member, the third minimum application of force greater than the second force.

B: The headrest of example A, wherein: the first leg, the intermediate member, and at least a first portion of the second leg are made of a first material having a first stiffness, and at least a second portion of the second leg is made of a second material having a second stiffness greater than the first stiffness.

C: The headrest of example A or example B, wherein the resilient member is a first resilient member, the headrest further comprising: a second resilient member extending at least partially between the rear surface and the second leg, the second resilient member being configured to compress in response to a fourth minimum application of force between the head of the passenger and the front surface of the resilient member, the fourth minimum application of force being equal to or greater than the second minimum application of force.

D: The headrest of any one of example A through example C, wherein: the first leg, the intermediate member, and the second leg form a substantially U-shaped portion of the frame; and the first leg displaces toward the second leg in response to the second force by bending about at least a portion of the intermediate member.

E: The headrest of any one of example A through example D, wherein the resilient member is secured in a fixed position relative to the vehicle and is configured to accommodate passenger heads arranged at different heights and having different sizes without movement of the resilient member.

F: An example vehicle headrest includes: a resilient member comprising a front surface positioned to contact a head of a passenger in the seat and a rear surface opposite the front surface, a portion of the resilient member configured to compress based at least in part on a first minimum application of force to the resilient member; and a coupling extending between the resilient member and a portion of a vehicle, the coupling configured to secure the resilient member relative to the vehicle and comprising: a first portion proximate the resilient member and configured to at least partially deform in response to a second minimum application of force to the resilient member, and a second portion proximate an attachment of the frame to the vehicle, the second portion configured to at least partially deform in response to a third minimum application of force to the resilient member, the third force being greater than the second force.

G: The vehicle headrest of example F, wherein the coupling further comprises: a first leg secured to the back surface of the resilient member; a second leg spaced from the first leg a distance away from the back surface of the resilient member; and an intermediate member extending between the first leg and the second leg, wherein the first portion of the coupling comprises the first leg, the intermediate member, and at least a portion of the second leg, and wherein the second portion of the frame comprises at least a portion of the second leg.

H: The vehicle headrest of example F or example G, wherein the first portion of the coupling comprises a first stiffness and the second portion of the coupling comprises a second stiffness which differs from the first stiffness.

I: The vehicle headrest of any one of example F through example H, wherein the first portion of the frame comprises a first tubular material having a first wall thickness and the section portion of the frame comprises a second tubular material having a second wall thickness greater than the first wall thickness.

J: The vehicle headrest of any one of example F through example I, wherein the resilient member is a first resilient member, the vehicle headrest further comprising: a second resilient member extending at least partially between the rear surface of the resilient member and the second portion of the frame member, the second resilient member configured to reduce an amount of deformation of the first portion in response to at least the second minimum application of force to the resilient member.

K: The vehicle headrest of any one of example F through example J, wherein: the front surface of the resilient member is sized to be contacted by passengers having different heights, including at least a first passenger having a height representative of passengers in a fifth percentile of passenger and a second passenger having at least one of height representative of passengers in a ninety-fifth percentile of passengers; the first portion of the coupling is configured to at least partially deform in response to the second minimum application of force applied by the first passenger or the second passenger; and the second portion of the coupling is configured to at least partially deform in response to the third minimum application of force applied by the first passenger or the second passenger.

L: The vehicle headrest of any one of example F through example K, wherein the resilient member comprises a polymeric material that compresses in response to the first minimum application of force.

M: The vehicle headrest of any one of example F through example L, wherein the resilient member is a first resilient member, the coupling is a first coupling, and the first resilient member and the first coupling comprise a first passenger headrest, the vehicle headrest further comprising: a second passenger headrest, the second passenger headrest comprising: a second resilient member, and a second coupling configured to secure the second resilient member relative to the vehicle; and a transverse frame extending between the first passenger headrest and the second passenger headrest to couple the first passenger headrest to the second passenger headrest.

N: The vehicle headrest of any one of example F through example M, wherein the transverse frame includes a weakened portion between the first passenger headrest portion and the second passenger headrest portion, the frame being configured to break at the weakened portion in response to a force differential between the first passenger headrest portion and the second passenger headrest portion.

O: An example vehicle comprising: a first passenger seat having a first seat portion and a first backrest portion; a second passenger seat adjacent the first passenger seat, the second passenger seat having a second seat portion and a second backrest portion; and a headrest extending above the first backrest portion and the second backrest portion, the headrest including a first passenger headrest portion associated with the first passenger seat and a second passenger headrest portion connected to the first passenger headrest portion and associated with the second passenger seat, at least one of the first passenger headrest portion or the second passenger headrest portion comprising: a resilient member comprising a front surface positioned to contact a head of a passenger in the seat and a rear surface opposite the front surface; and a coupling configured to secure the resilient member relative to the vehicle comprising: a first portion proximate the resilient member and configured to at least partially deform in response to at least a first force applied to the resilient member, and a second portion proximate an attachment of the coupling to the vehicle, the second portion configured to at least partially deform in response to at least a second force applied to the resilient member, the second force being greater than the first force.

P: The vehicle of example O, wherein: a portion of the resilient member is configured to compress in response to a third force applied to the resilient member, the third force being less than the first force.

Q: The vehicle of example O or example P, further comprising: a transverse frame connecting the first passenger headrest portion to the second passenger headrest portion.

R: The vehicle of any one of example O through example Q, wherein the transverse frame includes a weakened portion between the first passenger headrest portion and the second passenger headrest portion, the transverse frame being configured to separate at the weakened portion in response to a force differential between the first passenger headrest portion and the second passenger headrest portion.

S: The vehicle of any one of example O through example R, wherein the first portion of the coupling comprises a first stiffness and the second portion of the frame comprises a second stiffness which differs from the first stiffness T: The vehicle of any one of example O through example S, wherein: the resilient member comprises a first resilient member; and the at least one of the first passenger headrest portion or the second passenger headrest portion further comprises: a second resilient member extending at least partially between the rear surface of the first resilient member and the second portion of the coupling, the second resilient member configured to resist, at least partially, the deformation of the first portion upon application of at least the second force on the resilient member.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle headrest comprising:
   a first passenger headrest, the first passenger headrest comprising:
   a first resilient member comprising a front surface arranged to contact a head of a passenger and a rear surface opposite the front surface; and
   a first coupling extending between the first resilient member and a portion of the vehicle to secure the first resilient member relative to the vehicle, the first coupling comprising:
      a first leg secured to the rear surface of the first resilient member;
      a second leg spaced from the first leg; and
      an intermediate member extending between the first leg and the second leg proximate a top of the first coupling, wherein:
         a portion of the first resilient member is configured to compress in response to a first minimum application of force between the head of the passenger and the front surface of the first resilient member,
         the first leg is configured to displace toward the second leg by bending at a first bending location proximate a junction of the intermediate member and the second leg in response to a second minimum application of force between the head of the passenger and the front surface of the first resilient member, the second minimum application of force being greater than the first minimum application of force, and
         the second leg is configured to bend at a second bending location in response to a third minimum application of force between the head of the passenger and the front surface of the first resilient member, the third minimum application of force greater than the second minimum application of force;
   a second passenger headrest, the second passenger headrest comprising:
      a second resilient member, and
      a second coupling configured to secure the second resilient member relative to the vehicle; and
   a transverse frame extending between the first passenger headrest and the second passenger headrest to couple the first passenger headrest to the second passenger headrest,
      wherein the transverse frame includes a weakened portion between the first passenger headrest and the second passenger headrest, the transverse frame being configured to break at the weakened portion in response to a force differential between the first passenger headrest and the second passenger headrest.

2. The vehicle headrest of claim 1, wherein:
   the first leg, the intermediate member, and at least a first portion of the second leg are made of a first material having a first stiffness, and
   at least a second portion of the second leg is made of a second material having a second stiffness greater than the first stiffness.

3. The vehicle headrest of claim 1, further comprising:
   a third resilient member extending at least partially between the rear surface and the second leg, the third resilient member being configured to compress in response to a fourth minimum application of force between the head of the passenger and the front surface of the first resilient member, the fourth minimum application of force being equal to or greater than the second minimum application of force.

4. The vehicle headrest of claim 1, wherein:
   the first leg, the intermediate member, and the second leg form a substantially U-shaped portion of the first coupling; and
   the first leg displaces toward the second leg in response to the second minimum application of force by bending about at least a portion of the intermediate member.

5. The vehicle headrest of claim 1, wherein the first resilient member is secured in a fixed position relative to the vehicle and is configured to accommodate passenger heads arranged at different heights and having different sizes without movement of the first resilient member.

6. A vehicle headrest comprising:
   a first passenger headrest, the first passenger headrest comprising:
      a first resilient member comprising a front surface positioned to contact a head of a passenger and a rear surface opposite the front surface, a portion of the first resilient member configured to compress based at least in part on a first minimum application of force to the first resilient member, and
      a first coupling extending between the resilient member and a portion of a vehicle, the coupling configured to secure the first resilient member relative to the vehicle, the first coupling comprising:
         a first portion proximate the first resilient member and configured to at least partially deform in response to a second minimum application of force to the first resilient member, and
         a second portion proximate an attachment of the first coupling to the vehicle, the second portion configured to at least partially deform in response to a third minimum application of force to the first resilient, the third minimum application of force being greater than the second minimum application of force;
   a second passenger headrest, the second passenger headrest comprising:
      a second resilient member, and
      a second coupling configured to secure the second resilient member relative to the vehicle; and
   a transverse frame extending between the first passenger headrest and the second passenger headrest to couple the first passenger headrest to the second passenger headrest,
      wherein the transverse frame includes a weakened portion between the first passenger headrest and the second passenger headrest, the transverse frame being configured to break at the weakened portion in response to a force differential between the first passenger headrest and the second passenger headrest.

7. The vehicle headrest of claim 6, wherein the first coupling further comprises:
a first leg secured to the rear surface of the first resilient member;
a second leg spaced from the first leg a distance away from the rear surface of the first resilient member; and
an intermediate member extending between the first leg and the second leg,
wherein the first portion of the coupling comprises the first leg, the intermediate member, and at least a portion of the second leg, and
wherein the second portion of the first coupling is configured to at least partially deform in response to the third minimum application of force by bending at a bending location.

8. The vehicle headrest of claim 6, wherein the first portion of the first coupling comprises a first stiffness and the second portion of the first coupling comprises a second stiffness which differs from the first stiffness.

9. The vehicle headrest of claim 8, wherein the first portion of the first coupling comprises a first tubular material having a first wall thickness and the second portion of the first coupling comprises a second tubular material having a second wall thickness greater than the first wall thickness.

10. The vehicle headrest of claim 6, further comprising:
a third resilient member extending at least partially between the rear surface of the first resilient member and the second portion of the first coupling, the third resilient member configured to reduce an amount of deformation of the first portion in response to at least the second minimum application of force to the first resilient member.

11. The vehicle headrest of claim 6, wherein:
the front surface of the first resilient member is sized to be contacted by passengers having different heights, including at least a first passenger having a height representative of passengers in a fifth percentile of passenger and a second passenger having at least one of height representative of passengers in a ninety-fifth percentile of passengers;
the first portion of the first coupling is configured to at least partially deform in response to the second minimum application of force applied by the first passenger or the second passenger; and
the second portion of the first coupling is configured to at least partially deform in response to the third minimum application of force applied by the first passenger or the second passenger.

12. The vehicle headrest of claim 6, wherein the first resilient member comprises a polymeric material that compresses in response to the first minimum application of force.

13. The vehicle headrest of claim 6, wherein the first portion is configured to bend about a first bending location spaced from the first resilient member in response to the second minimum application of force; and
the second portion is configured to at least partially deform by bending at a second bending location in response to the third minimum application of force.

14. The vehicle headrest of claim 6, wherein the first portion is configured to at least partially non-resiliently move in response to the second minimum application of force, and the second portion is configured to at least partially non-resiliently deform in response to the third minimum application of force.

15. A vehicle headrest comprising:
a first passenger headrest, the first passenger headrest comprising:
a first resilient member comprising a front surface positioned to contact a head of a passenger and a rear surface opposite the front surface, a portion of the first resilient member configured to compress based at least in part on a first minimum application of force to the first resilient member, and
a first coupling configured to secure the first resilient member relative to a vehicle, the first coupling comprising:
a first portion configured to at least partially deform in response to a second minimum application of force to the first resilient member while providing support to the head via the first resilient member during a collision event, and
a second portion configured to at least partially deform in response to a third minimum application of force to the first resilient member resulting from the collision event while providing support to the head via the first resilient member during the collision event, the third minimum application of force being greater than the second minimum application of force;
a second passenger headrest, the second passenger headrest comprising:
a second resilient member, and
a second coupling configured to secure the second resilient member relative to the vehicle; and
a transverse frame extending between the first passenger headrest and the second passenger headrest to couple the first passenger headrest to the second passenger headrest,
wherein the transverse frame includes a weakened portion between the first passenger headrest and the second passenger headrest, the transverse frame being configured to break at the weakened portion in response to a force differential between the first passenger headrest and the second passenger headrest.

16. The vehicle headrest of claim 15, wherein the first portion of the first coupling comprises a first stiffness and the second portion of the first coupling comprises a second stiffness which differs from the first stiffness.

17. The vehicle headrest of claim 16, wherein the first portion of the first coupling comprises a first tubular material having a first wall thickness and the second portion of the first coupling comprises a second tubular material having a second wall thickness greater than the first wall thickness.

18. The vehicle headrest of claim 6, further comprising:
a mounting member configured to secure the second portion to a portion of the vehicle,
wherein the third minimum application of force causes the second portion to rotate relative to the mounting member to reduce an angle between the second portion and the mounting member.

* * * * *